United States Patent
Nohl et al.

(10) Patent No.: US 10,551,495 B2
(45) Date of Patent: Feb. 4, 2020

(54) APPARATUS FOR WARNING A DRIVER OF A VEHICLE ABOUT A STATIONARY OBJECT AND VEHICLE HAVING SUCH AN APPARATUS

(71) Applicant: KNORR-BREMSE SYSTEME FUER NUTZFAHRZEUGE GMBH, Munich (DE)

(72) Inventors: Andreas Nohl, Gaeufelden (DE); Ulrich Guecker, Schwieberdingen (DE); Jochen Banspach, Helmstadt-Bargen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/330,132

(22) PCT Filed: Aug. 16, 2017

(86) PCT No.: PCT/EP2017/070756
§ 371 (c)(1),
(2) Date: Mar. 4, 2019

(87) PCT Pub. No.: WO2018/046263
PCT Pub. Date: Mar. 15, 2018

(65) Prior Publication Data
US 2019/0212439 A1     Jul. 11, 2019

(30) Foreign Application Priority Data
Sep. 9, 2016   (DE) .................. 10 2016 116 964

(51) Int. Cl.
*G01S 13/93*     (2006.01)
*G01S 17/93*     (2006.01)
*B60W 50/14*     (2012.01)

(52) U.S. Cl.
CPC ........... *G01S 13/931* (2013.01); *B60W 50/14* (2013.01); *G01S 17/936* (2013.01);
(Continued)

(58) Field of Classification Search
None
See application file for complete search history.

(56) References Cited

U.S. PATENT DOCUMENTS 6,230,093 B1 * 5/2001 Michi ................. G01S 13/931
                                                            180/167
6,853,906 B1 * 2/2005 Michi ................ B60K 31/0008
                                                             701/410
(Continued)

FOREIGN PATENT DOCUMENTS

DE    19654538 A1    7/1997
DE    10354072 A1    6/2005
(Continued)

OTHER PUBLICATIONS

International Search Report dated Oct. 25, 2017, of the corresponding International Application PCT/EP2017/070756 filed Aug. 16, 2017.

*Primary Examiner* — Fekadeselassie Girma
(74) *Attorney, Agent, or Firm* — Norton Rose Fulbright US LLP

(57) ABSTRACT

An apparatus/vehicle for warning a driver of a vehicle or vehicle/trailer (V-VT) about a stationary object (SO): a) a sensor device having a detection area (DA) including a side DA arranged laterally from a vehicle side (VS) and extending front to rear, in the direction of a longitudinal centerline of the (V-VT), and detecting the SO within the DA; b) a control device to evaluate the sensor signals as to the SO detected within the DA and define a dynamically alterable warning area (WA) that is no more than the side DA; c) a warning device to generate a warning signal if the sensor (Continued)

device detects the object(s) in the WA; d) the control device, on detection of the SO within the side DA and on detection of the (V-VT) turning toward the VS on which the side DA is situated, to assign a triangular cross-section to the WA.

11 Claims, 2 Drawing Sheets

(52) U.S. Cl.
CPC ....... *B60T 2210/24* (2013.01); *B60T 2210/34* (2013.01); *B60W 2050/143* (2013.01); *G01S 2013/9332* (2013.01); *G01S 2013/9353* (2013.01); *G01S 2013/9367* (2013.01); *G01S 2013/9375* (2013.01); *G01S 2013/9378* (2013.01)

(56) References Cited

U.S. PATENT DOCUMENTS

| | | | |
|---|---|---|---|
| 2001/0016798 A1* | 8/2001 | Kodaka | B62D 15/0265 701/301 |
| 2007/0282530 A1* | 12/2007 | Meister | B60K 31/0008 701/301 |
| 2012/0035846 A1 | 2/2012 | Sakamoto et al. | |
| 2014/0347208 A1* | 11/2014 | Schoor | G01S 7/354 342/133 |
| 2015/0002672 A1* | 1/2015 | Hayakawa | B60R 1/00 348/148 |
| 2015/0025786 A1* | 1/2015 | Hohm | B60W 40/105 701/300 |
| 2015/0186733 A1* | 7/2015 | Hayakawa | G08G 1/166 382/103 |
| 2015/0276923 A1* | 10/2015 | Song | G01S 7/4004 702/97 |
| 2015/0325005 A1* | 11/2015 | Hayakawa | G06T 7/42 348/148 |
| 2017/0160391 A1* | 6/2017 | Satou | G01S 13/536 |
| 2018/0045811 A1* | 2/2018 | Cao | G01S 7/4004 |
| 2018/0061236 A1* | 3/2018 | Yamamoto | B60R 21/00 |
| 2018/0172802 A1* | 6/2018 | Sturm | G01S 13/931 |
| 2018/0341012 A1* | 11/2018 | Takada | G01S 13/52 |
| 2019/0107602 A1* | 4/2019 | Kitamura | G01S 7/40 |
| 2019/0285743 A1* | 9/2019 | Kaino | G01S 13/931 |
| 2019/0303690 A1* | 10/2019 | Nonaka | G06K 9/3241 |

FOREIGN PATENT DOCUMENTS

| | | |
|---|---|---|
| DE | 102009041555 A1 | 6/2010 |
| DE | 102010048144 A1 | 7/2011 |
| DE | 102010023164 A1 | 12/2011 |
| DE | 102013020733 A1 | 6/2015 |
| EP | 1533776 A2 | 5/2005 |

* cited by examiner

APPARATUS FOR WARNING A DRIVER OF A VEHICLE ABOUT A STATIONARY OBJECT AND VEHICLE HAVING SUCH AN APPARATUS

FIELD OF THE INVENTION

The invention relates to an apparatus for warning a vehicle driver of a vehicle about a stationary object and to a vehicle having such an apparatus.

BACKGROUND INFORMATION

With such warning apparatuses, it is desirable for warnings about the objects detected by the sensor device to be given only if this is also actually appropriate in view of the driving situation, because otherwise unnecessarily frequent generation of warning signals means that the driver's acceptance of the apparatus is reduced.

An apparatus of the type in question is discussed in DE 10 2009 041 555 A1, for example. This document describes dynamic range limiting for the detection area for a turning assist system and a blind spot assist system. In particular, it describes a lateral and rectangular warning area that is dynamically alterable on the basis of the speed of the vehicle as seen in a direction perpendicular to a vehicle side. The dynamic lateral warning area extends between a non-zero lateral minimum distance (0.4 meter) and a maximum distance (2.5 meters) from the vehicle. When the vehicle turns, a future travel corridor and a tractrix of the vehicle are estimated. A warning signal about stationary objects is generated only if a stationary object is in the travel corridor, including the tractrix, of the vehicle. The document does not specifically reveal how the travel corridor, including the tractrix, of the vehicle are estimated.

SUMMARY OF THE INVENTION

The present invention is by contrast based on the object of developing an apparatus of the type described above further such that no unnecessary warning signals are generated. Furthermore, the aim is also to provide a vehicle having such an apparatus.

According to the invention, this object may be achieved by the features of the method and/or systems as described herein.

The invention sets out from an apparatus for warning a vehicle driver of a vehicle or of a vehicle/trailer combination about a stationary object, including at least the following:

a) a sensor device having a detection area comprising a side detection area that is arranged laterally from a vehicle side and extends from a vehicle front to a vehicle rear, as seen in the direction of a longitudinal centerline of the vehicle or of the vehicle/trailer combination, wherein the sensor device is configured so that it can detect a stationary object within the detection area, b) a control device, interacting with the sensor device, that is configured so that it evaluates the signals of the sensor device in respect of stationary objects detected within the detection area and defines a dynamically alterable warning area that is smaller than the side detection area or no more than the same as it, c) a warning device actuated by the control device such that it generates a warning signal to warn the vehicle driver only if the sensor device detects a stationary object in the dynamically alterable warning area.

In particular, the warning area is altered in a lateral direction, while it remains constant as seen in the direction of the longitudinal centerline of the vehicle or of the vehicle/trailer combination and is restricted to the length of the vehicle or of the vehicle/trailer combination.

According to the invention, there is then provision that d) the control device is furthermore configured so that, on detection of a stationary object within the side detection area and on detection of the vehicle or the vehicle/trailer combination turning toward the vehicle side on which said side detection area is situated, it assigns a triangular cross section to the dynamically alterable warning area, wherein d1) a first corner of the triangular cross section is arranged at the front edge or at a front wheel of this vehicle side of the vehicle or of the vehicle/trailer combination, a second corner of the triangular cross section is arranged at the rear edge or at a rear wheel of this vehicle side of the vehicle or of the vehicle/trailer combination and a third corner of the triangular cross section is arranged on a line that is perpendicular to the longitudinal centerline of the vehicle or of the vehicle/trailer combination and extends laterally outward from the first corner, wherein d2) a distance between the first corner and the third corner, as seen perpendicular to the longitudinal centerline of the vehicle or of the vehicle/trailer combination, is calculated on the basis of the length of the vehicle or of the vehicle/trailer combination, and on the basis of the position of the detected stationary object, as seen parallel to the longitudinal centerline of the vehicle or of the vehicle/trailer combination, and of a fictitious radius is calculated that the vehicle can still travel on at its speed prevailing during turning without a maximum permitted transverse acceleration being exceeded in the process, or of an actual radius that the vehicle or the vehicle/trailer combination actually travels on when turning and that is determined on the basis of the speed prevailing when the vehicle or the vehicle/trailer combination turns and the transverse acceleration of the vehicle or of the vehicle/trailer combination that prevails at that time.

In other words, a triangular dynamically alterable warning area is defined that is based on the travel corridor of the vehicle or of the vehicle/trailer combination when turning, including tractrix as is produced when turning with the then fictitious minimum radius that the vehicle or the vehicle/trailer combination can still travel on at its speed prevailing when turning without a maximum permitted transverse acceleration being exceeded in the process. Under these prerequisites, turning produces a minimum radius and maximum travel corridor traveled on by the vehicle, based on the spread of said travel corridor, including tractrix, in particular in view of its lateral spread transversely with respect to the direction of travel.

The maximum permitted transverse acceleration may be obtained from empirical values and forms a safety limit, i.e. no risk of overturning or inadmissible critical driving situations can arise with transverse accelerations up to the maximum permitted transverse acceleration. Consequently, a maximum travel corridor is assumed in the case of "maximum possible turning" of the vehicle or of the vehicle/trailer combination, and then this is taken as a basis for forming the triangular dynamically alterable warning area.

Alternatively, the triangular dynamically alterable warning area or the distance is calculated on the basis of the actual radius that the vehicle or the vehicle/trailer combination actually travels on when turning and that then determines the actual travel corridor of the vehicle or of the vehicle/trailer combination when turning and that is determined on the basis of the speed prevailing when the vehicle or the vehicle/trailer combination turns and the transverse acceleration that prevails at that time.

Thus, the maximum or actual travel corridor when turning represents particularly the area that is critical in regard to stationary objects situated within this travel corridor. The reason is that stationary objects of this kind can then be expected to be detected by the vehicle or by the vehicle/trailer combination when turning.

To simplify matters, the maximum or actual travel corridor actually bounded by arc-shaped paths of the front and rear wheels in the side detection area is then approximated by the triangular dynamically alterable warning area. If a test then reveals that the detected stationary object is situated within the triangular dynamically alterable warning area, then a warning signal is output, otherwise not.

Since the triangular dynamically alterable warning area is based on the maximum or actual travel corridor, including tractrix, and in particular is also somewhat larger than it, this warning area excludes areas that are at any rate not covered by the actual travel corridor, including tractrix, and would therefore trigger only unnecessary warning signals if a stationary object were situated therein. Overall, this allows unnecessary warning signals to be avoided, which increases acceptance of the apparatus by the vehicle driver.

The measures set out in the subclaims allow advantageous developments and improvements of the first aspect of the invention.

According to an embodiment, the control device is furthermore configured so that it calculates the radius r according to the following calculation rule:

$$r=v\_ego^2/a\_lat\_max, \text{ or}$$

$$r=v\_ego^2/a\_lat$$

where
v_ego is the speed of the vehicle or of the vehicle/trailer combination when turning, and
a_lat_max is the maximum permitted transverse acceleration of the vehicle or of the vehicle/trailer combination when turning,
a_lat is the actual transverse acceleration of the vehicle or of the vehicle/trailer combination when turning.

When $r=v\_ego^2/a\_lat\_max$, the radius r is a minimum radius r_min.

According to one development, the control device is furthermore configured so that it calculates a maximum distance dy_max between the first corner and the third corner of the triangular cross section, which distance represents an upper limit for the distance dy_info between the first corner and the third corner of the triangular cross section, as seen perpendicular to the longitudinal centerline of the vehicle, according to the following calculation rule:

$$dy\_max=\sqrt{r^2+l_{truck}^2}-r$$

where
l_truck is the length of the vehicle or of the vehicle/trailer combination, and
r is the radius described above.

The maximum distance dy_max corresponds in this case to the lateral distance between the path of the right-hand rear wheel and the path of the right-hand front wheel when turning right or to the distance between the path of the left-hand rear wheel and the path of the left-hand front wheel when turning left. In this case, it is assumed that the detected stationary object is situated to the right or left laterally from the vehicle and, as seen in the direction of the longitudinal centerline of the vehicle or of the vehicle/trailer combination, at the height or level of the vehicle front.

Since this position of the object 4 is not permanently present and changes with the movement of the vehicle 1 when turning relative to the vehicle, however, the control device may be furthermore configured so that it calculates the distance dy_info between the first corner and the third corner of the triangular cross section of the dynamically alterable warning area, as seen perpendicular to the longitudinal centerline of the vehicle, on the basis of the position dx of the stationary object, as seen parallel to the longitudinal centerline of the vehicle, according to the following calculation rule:

$$dy\_info=dy\_max*(l\_truck+dx)/l\_truck$$

where
dy_max is the maximum distance between the first corner and the third corner of the triangular cross section, as seen perpendicular to the longitudinal centerline of the vehicle, and
dx is the detected position of the stationary object within the side detection area, as seen parallel to the longitudinal centerline of the vehicle, for example starting from a vehicle front, and
l_truck is the length of the vehicle or of the vehicle/trailer combination.

The control device can also be configured such that it can receive signals representing turning of the vehicle, for example from a direction of travel indicator and/or from a steering wheel angle sensor.

The sensor device and also the origin of a coordinate system fixed to the vehicle may be arranged at the first corner, i.e. at the front vehicle edge between the front surface and the side surface, or at the right-hand front wheel, so that variables such as e.g. the detected position dx of the stationary object, the maximum distance dy_max between the first corner and the third corner of the triangular cross section and the distance dy_info between the first corner and the third corner of the triangular cross section can be determined for example from that point in the coordinate system fixed to the vehicle.

According to one development, the side detection area of the detection area is arranged laterally from the vehicle side that is the vehicle side facing away from a driver's seat of the vehicle. It is then possible to avoid critical situations particularly for left-hand control vehicles when turning right. Alternatively, the side detection area of the detection area can also be arranged laterally from the vehicle side that is the vehicle side facing the driver's seat of the vehicle. In this case, critical situations when turning left can be avoided.

According to one development, the warning device can be configured so that it generates a cascade of warning signals on the basis of a hazard level of the by the by the turning of the vehicle toward the detected stationary object. The warning signals can be for example visible signals with respective different colors and/or audible signals with respective different sounds and/or sound sequences.

A cascade of warning signals can in this case include for example colors of a visible signal that are dependent on the hazard level and/or an audible signal that is dependent on the hazard level. By way of example, the warning device can generate a visible green warning signal when there is a negligible hazard level, a visible yellow warning signal when there is a low hazard level, a visible red visible warning signal when there is a medium hazard level and a visible red signal and additionally an audible signal when there is a high hazard level. It is also possible for the frequency and/or sound sequence of the audible signal to be varied on the basis of the hazard level.

As a result, the road safety attainable by the apparatus becomes advantageously high overall without the driver being distracted by excessively frequent and numerous warning signals.

The invention also relates to a vehicle provided with an apparatus as described above.

An exemplary embodiment of the invention is depicted below in the drawing and explained in more detail in the description that follows.

DETAILED DESCRIPTION

Figure 1:
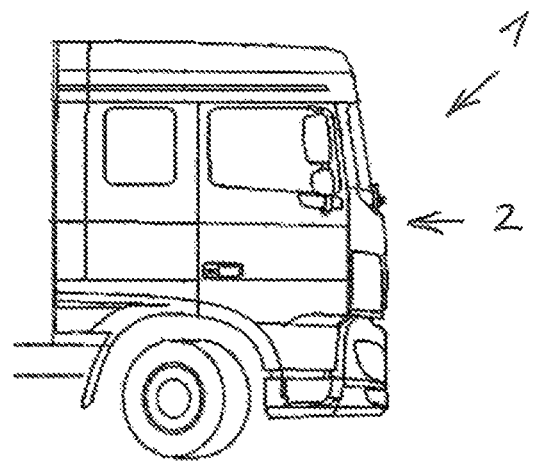
FIG. 1 shows a front portion of a side view of a vehicle with an apparatus for warning a vehicle driver of a vehicle about a stationary object according to an embodiment of the invention.

FIG. 1 shows a front portion of a side view of an in this case for example left-hand drive vehicle 1, in particular of a towing vehicle of a towing vehicle/trailer combination with an apparatus 2 for warning a vehicle driver of the vehicle about a stationary object 4 according to an embodiment of the invention. Instead of just the towing vehicle 1, the vehicle can also consist of a towing vehicle/trailer combination, such as for example a tractor/semitrailer combination or a truck/trailer combination.

The apparatus 2 includes a sensor device 6 having a detection area 8 extending at least from a front detection area 12, arranged in front of a vehicle front 10, via a side detection area 16, arranged laterally from an in this case for example right-hand vehicle side 14, to an end of a rear detection area 18 that points away from the side detection area 16 behind the vehicle rear 20. The side detection area 16 extends in particular from the vehicle front 10 to the vehicle rear 20 (FIG. 2).

The detection area 8 is depicted with a rectangular shape in this case in an idealized manner, but can have any shape depending on the type of the sensor device 6. The sensor device 6 can detect an in particular stationary object 4 within the detection area 8, i.e. the position of said object in relation to a coordinate system, which is fixed to the vehicle, for example.

Figure 2:
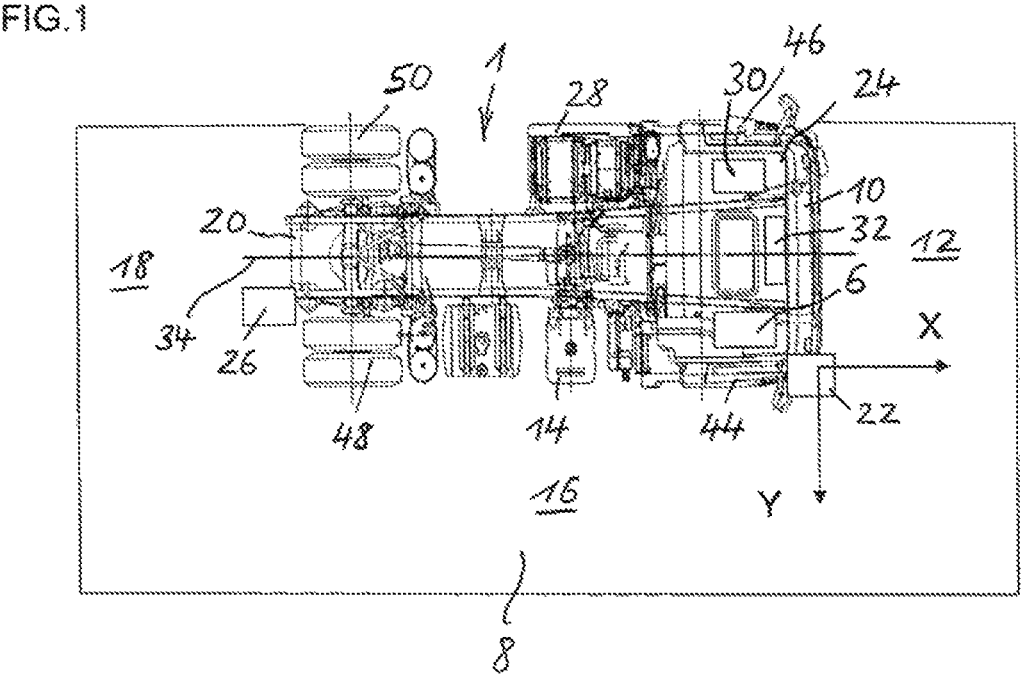
FIG. 2 shows a plan view of the vehicle from FIG. 1 with a symbolically depicted detection area of a sensor device of the apparatus.

In FIG. 1 and FIG. 2, it is possible to see, for the sensor device 6, a first sensor 22 on the right-hand front edge of a driver's cab 24 and a second sensor 26 at the rear end of a longitudinal frame support, on the right in the direction of travel, of a ladder frame of the towing vehicle. Beyond that, the sensor device 6 can also include further sensors that then widen the detection area 8, for example also to the other side detection area on the left-hand vehicle side 28. The sensor or sensors is/are for example radar sensors, laser sensors or else cameras.

Furthermore, the apparatus 2 also includes a control device 30, interacting with the sensor device 6, that is configured so that it evaluates the signals of the sensor device 6 for whether a stationary object 4 is situated within the detection area 8. Outside the detection area 8, no detection of objects 4 is meant to be possible. Stationary means that the object is not moving absolutely, i.e. as seen in relation to the surroundings.

The vehicle in this case has for example two axles, a front axle having a right-hand front wheel 44 and a left-hand front wheel 46 and a rear axle having in this case for example two right-hand rear wheels 48 and two left-hand rear wheels 50.

Figure 3:
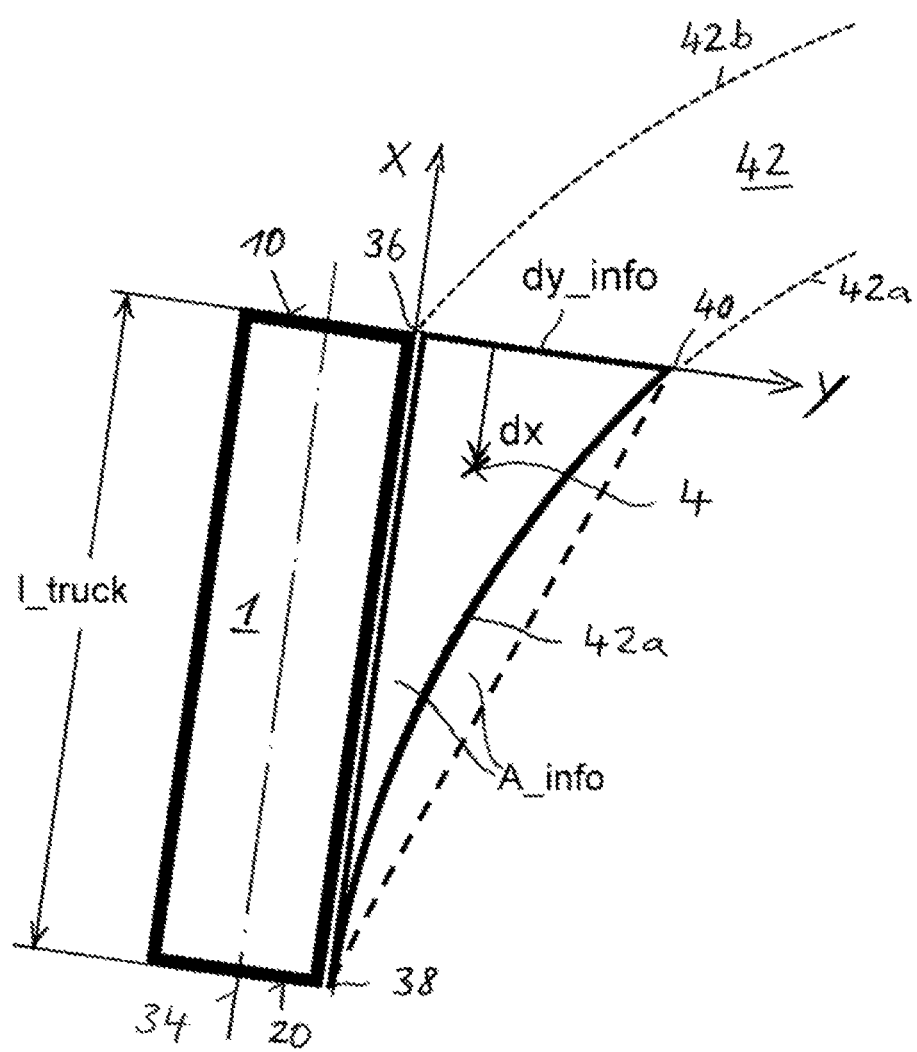
FIG. 3 shows a highly schematized plan view of the vehicle from FIG. 1 with a symbolically depicted dynamically alterable warning area A_info of the apparatus.

The control device 30 is configured so that it defines a dynamically alterable warning area A_info, which is depicted in FIG. 3. Dynamically alterable warning area A_info means that an outer limit or at least one edge of the warning area A_info is alterable. The dynamically alterable warning area A_Info is in this case always smaller than or the same as the side detection area 16, i.e. it generally cannot be larger than the side detection area 16.

The warning area A_info is in this case altered in particular only in a lateral direction within the side detection area 16, whereas it remains constant as seen in the direction of a longitudinal centerline 34 of the vehicle 1 and is restricted to the length l_truck of the vehicle 1.

The apparatus 2 also comprises a warning device 32 actuated by the control device 30 such that it generates a warning signal to warn the vehicle driver only when the sensor device 6 detects a stationary object 4 within the dynamically alterable warning area A_info.

The control device 30 can furthermore receive signals representing turning of the vehicle 1 to the right or to the left, for example from a direction of travel indicator and/or from a steering wheel angle sensor.

The control device 30 is furthermore configured so that, on detection of a stationary object 4 within the side detection area 16 and on detection of the vehicle turning toward the in this case for example right-hand vehicle side 14, on which the right-hand side detection area 16 is situated, it assigns a triangular cross section to the dynamically alterable warning area A_info, as revealed by FIG. 3.

The triangular dynamically alterable warning area A_info is based on the travel corridor 42, including tractrix, of the vehicle 1 when turning, in this case for example to the right, wherein the travel corridor 42 shown in FIG. 3 is bounded by the path 42a of the two right-hand rear wheels 48 and by the path 42b of the right-hand front wheel 44.

For the calculation or definition of the triangular dynamically alterable warning area A_info it is assumed, when turning, according to a first alternative, that the vehicle is moving along a minimum radius r_min that the vehicle 1 can still travel on at its speed v_ego prevailing when turning without a maximum permitted transverse acceleration a_lat_max being exceeded at that time. This is because, under these prerequisites, a maximum travel corridor 42 is produced, in particular in respect of its lateral spread in the Y direction.

Alternatively, for the calculation or definition of the triangular dynamically alterable warning area A_info, it can be assumed that the vehicle, when turning, moves with a transverse acceleration a_lat less than the maximum permitted transverse acceleration a_lat_max. In this case, the actual radius r that the vehicle 1 travels on when turning, and that is determined on the basis of the speed v_ego prevailing when the vehicle 1 turns and the directly or indirectly measured transverse acceleration a_lat that prevails at that time, is used.

To simplify matters, the actually arc-shaped path 42a of the right-hand rear wheels 48 within the side detection area 16 in FIG. 3 is linearly approximated in the side detection area 16, this being depicted in dashes. As such, the triangular cross section of the warning area A_info is then produced in the side detection area 16. This warning area A_info is then somewhat larger than the actual travel corridor 42.

In this case, a first corner 36 of the triangular cross section of the warning area A_info is situated at the right-hand front wheel 44 of the vehicle 1, that is to say in this case for example at the front right-hand edge of the vehicle 1, where the vehicle front 10 and the right-hand vehicle side 14 meet. To simplify matters, it can be assumed that the right-hand front wheel of the vehicle 1 is situated at the front right-hand edge of the vehicle.

A second corner 38 of the triangular cross section of the warning area A_info is then situated, in a simplified manner, at the rear right-hand edge of the vehicle 1, where the two right-hand rear wheels 48 are also arranged and where the right-hand vehicle side 14 and the vehicle rear 20 also approximately meet.

In the case of a vehicle/trailer combination consisting of a towing vehicle and a trailer, the first corner 36 of the triangular cross section of the warning area A_info is situated at the right-hand front wheel 44 of the towing vehicle 1, that is to say for example at the front right-hand edge of the towing vehicle 1, where the vehicle front 10 and the right-hand vehicle side 14 of the towing vehicle meet. The second corner 38 of the triangular cross section of the warning area A_info is then situated at the rear right-hand edge of the trailer, where the right-hand rear wheel of the trailer is also arranged and where the right-hand vehicle side and the vehicle rear of the trailer also approximately meet.

A third corner 40 of the triangular cross section of the warning area A_info is arranged on a line that is perpendicular to the longitudinal centerline 34 of the vehicle 1 and extends laterally outward from the first corner 36.

The first corner 36 of the triangular cross section of the warning area A_info, on which the first sensor 22 is also arranged, is assumed to have the origin of the X-Y coordinate system that is fixed to the vehicle, wherein the X axis is parallel to the longitudinal centerline 34 of the vehicle and the Y axis is perpendicular thereto and thus extends outward in a transverse direction.

For the triangular cross section of the warning area A_info, a distance dy_info between the first corner 36 and the third corner 40, as seen perpendicular to the longitudinal centerline 34 of the vehicle or in this case in the Y direction, is in this case dependent on at least the following variables:
the length l_truck of the vehicle 1,
the position dx of the detected stationary object 4, as seen parallel to the longitudinal centerline 34 of the vehicle 1 or in this case in the X direction, and
on a (fictitious and minimum) radius r that the vehicle 1 can still travel on at its speed prevailing when turning right without the maximum permitted transverse acceleration a_lat_max being exceeded in the process, or
on the actual radius r that the vehicle 1 actually travels on when turning right and that is then determined on the basis of the speed v_ego prevailing when the vehicle 1 turns and the transverse acceleration a_lat that prevails at that time.

In other words, a triangular dynamically alterable warning area is defined that is based on a (fictitious) travel corridor 42, including tractrix, of the vehicle 1 when turning, as produced when turning at a (fictitious and minimum) radius r that the vehicle 1 can still travel on at its speed v_ego prevailing when turning without a maximum permitted transverse acceleration a_lat_max being exceeded in the process.

Alternatively, the triangular dynamically alterable warning area is defined that is based on an actual travel corridor 42, including tractrix, of the vehicle 1 when turning, which is calculated on the basis of a radius r that the vehicle 1 actually travels on when turning, which is determined on the basis of the speed v_ego prevailing when the vehicle 1 turns and the transverse acceleration a_lat that prevails at that time.

The maximum permitted transverse acceleration a_lat_max may be obtained from empirical values and forms a safety limit, i.e. no risk of overturning or inadmissible critical driving situations, such as e.g. inadmissible oversteering or understeering, can arise with transverse accelerations up to the maximum permitted transverse acceleration a_lat_max. Consequently, "maximum possible turning" of the vehicle is assumed and this is taken as a basis for forming the triangular dynamically alterable warning area A_info.

The transverse acceleration a_lat prevailing for the alternative approach when the vehicle 1 turns can be measured directly or indirectly.

If a test then reveals that the detected stationary object 4 is situated within the triangular dynamically alterable warning area A_info, a warning signal is output, otherwise not.

The control device 30 may be configured so that it calculates the radius according to the following calculation rule:

$$r = v\_ego^2 / a\_lat\_max \qquad (1)$$

$$r = v\_ego^2 / a\_lat \qquad (1')$$

where
v_ego is the speed of the vehicle 1 or of the vehicle/trailer combination when turning, and
a_lat_max is the maximum permitted transverse acceleration of the vehicle 1 or of the vehicle/trailer combination when turning,
a_lat is the actual transverse acceleration of the vehicle 1 or of the vehicle/trailer combination when turning.

The control device 30 is furthermore configured so that it calculates a maximum distance dy_max between the first corner 36 and the third corner 40 of the triangular cross section of the dynamically alterable warning area A_info, as seen perpendicular to the longitudinal centerline 34 of the vehicle 1, which distance represents an upper limit for the distance dy_info between the first corner 36 and the third corner 40 of the triangular cross section, according to the following calculation rule:

$$dy\_max = \sqrt{r^2 + l_{truck}^2} - r \qquad (2)$$

where
l_truck is the length of the vehicle 1, and
r is the radius calculated above according to (1) or (1').

The maximum distance dy_max between the first corner 36 and the third corner 40 corresponds in this case to the distance between the path 42a of the right-hand rear wheels 48 and the path 42a of the right-hand front wheel 44 when turning right or to the distance between the path of the left-hand rear wheels 50 and the path of the left-hand front wheel 46 when turning left, which is not considered here, however. In this case, it is assumed that the detected stationary object 4 here is situated on the right laterally from the vehicle 1 and, as seen in the direction of the longitudinal centerline 34 of the vehicle 1, at the level of the vehicle front 10.

Since this position of the object 4 is not permanently present and changes with the movement of the vehicle 1 when turning relative to the vehicle, however, the control device 30 may be furthermore configured so that it calculates the distance dy_info between the first corner 36 and the third corner 40 of the triangular cross section, as seen perpendicular to the longitudinal centerline 43 of the vehicle, on the basis of the detected position dx of the stationary object 4, as seen parallel to the longitudinal centerline 34 of the vehicle 1, in this case for example starting from the origin of the coordinate system X-Y, according to the following calculation rule:

$$dy\_info = dy\_max * (l\_truck + dx)/l\_truck \qquad (3)$$

where
- dy_max is the maximum distance between the first corner 36 and the third corner 40 of the triangular cross section, as seen perpendicular to the longitudinal centerline 43 of the vehicle 1, and
- dx is the detected position of the stationary object, as seen parallel to the longitudinal centerline 34 of the vehicle 1 in this case for example starting from the origin of the coordinate system X-Y fixed to the vehicle and
- l_truck is the length of the vehicle 1.

(3) thus takes into consideration the present position dx of the stationary object 4 parallel to the longitudinal centerline 34 of the vehicle.

Since the first sensor 22 may be arranged at the first corner 36, where the origin of the X-Y coordinate system is also situated, variables such as e.g. the position dx of the stationary object 4, the maximum distance dy_max between the first corner 36 and the third corner 40 of the triangular cross section and the distance dy_info between the first corner 36 and the third corner 40 of the triangular cross section can be determined in the X-Y coordinate system, for example.

The triangular cross section of the dynamically alterable warning area A_info will be calculated below using an example:

if the vehicle 1, when turning right in this case, for example, has a speed v_ego of 5 m/s and a maximum transverse acceleration a_lat_max of 1.5 m/s² is permissible in this case, then according to (1) a then minimum radius r of 16.7 m is obtained. If the vehicle length l_truck is 10 m, for example, then the maximum lateral distance dy_max between the first corner 36 and the third corner 40 according to (2) is 2.77 m. This maximum lateral distance dy_max between the first corner 36 and the third corner 40 applies only when the object 4 is situated on the right laterally from the vehicle 1 and parallel to the front surface 10 (dx=0), however. When the vehicle is moved, e.g. within 1 s, the distance in the X direction has increased to dx=5 m. (3) is then used to calculate a distance dy_info of 1.38 m in the case of dx=5 m for the object 4. When an object 4 is at a distance of dx=5 m from the vehicle front 10, there is thus a risk of collision with the vehicle 1 when turning right only if the object 4 is within the warning area A_Info that has a transverse extent of dy_info=1.38 m between the first corner 36 and the third corner 40 at the level of the vehicle front 10, which would be the case here. The control device 30 then actuates the warning device 32 to generate a warning signal.

If, as in this case, for example the side detection area 16 of the detection area 8 is arranged laterally from the right-hand vehicle side 14, which is the vehicle side facing away from a driver's seat of the vehicle, then it is possible to avoid critical situations particularly for left-hand control vehicles when turning right. Alternatively, the side detection area of the detection area 8 can also be arranged laterally from the left-hand vehicle side 28. In this case, it is possible to avoid critical situations particularly for right-hand control vehicles when turning left.

The warning device 32 may be configured so that it generates a cascade of warning signals on the basis of a hazard level of the by the by the turning of the vehicle 1 toward the detected stationary object 4. The warning signals can be for example visible signals with respective different colors and/or audible signals with respective different sounds and/or sound sequences.

A cascade of warning signals can in this case include for example colors of a visible signal that are dependent on the hazard level and/or an audible signal that is dependent on the hazard level. By way of example, the warning device 32 can generate a visible green warning signal when there is a negligible hazard level, a visible yellow warning signal when there is a low hazard level, a visible red visible warning signal when there is a medium hazard level and a visible red signal and additionally an audible signal when there is a high hazard level. It is also possible for the frequency and/or sound sequence of the audible signal to be varied on the basis of the hazard level.

The list of reference signs is as follows:
1 vehicle
2 apparatus
4 object
6 sensor device
8 detection area
10 vehicle front
12 front detection area
14 right-hand vehicle side
16 side detection area
18 rear detection area
20 vehicle rear
22 first sensor
24 driver's cab
26 second sensor
28 left-hand vehicle side
30 control device
32 warning device
34 longitudinal centerline
36 first corner
38 second corner
40 third corner
42 travel corridor
42a path of the right-hand rear wheels
42b path of the right-hand front wheel
44 right-hand front wheel
46 left-hand front wheel
48 right-hand rear wheels
50 left-hand rear wheels

The invention claimed is:

1. An apparatus for warning a vehicle driver of a vehicle or of a vehicle/trailer combination about a stationary object, comprising:
   a) a sensor device having a detection area comprising a side detection area that is arranged laterally from a vehicle side and extends from a vehicle front to a vehicle rear, as seen in the direction of a longitudinal centerline of the vehicle or of the vehicle/trailer combination, wherein the sensor device is configured so that it can detect a stationary object within the detection area;

b) a control device, interacting with the sensor device, that is configured so that it evaluates the signals of the sensor device in respect of stationary objects detected within the detection area and defines a dynamically alterable warning area (A_info) that is smaller than the side detection area or no more than the same as it;

c) a warning device actuated by the control device such that it generates a warning signal to warn the vehicle driver only if the sensor device detects a stationary object in the dynamically alterable warning area (A_info);

wherein:

d) the control device is configured so that, on detection of a stationary object within the side detection area and on detection of the vehicle or the vehicle/trailer combination turning toward the vehicle side on which the side detection area is situated, it assigns a triangular cross section to the dynamically alterable warning area (A_info), wherein:

d1) a first corner of the triangular cross section is arranged at the front edge or at a front wheel of this vehicle side of the vehicle or of the vehicle/trailer combination, a second corner of the triangular cross section is arranged at the rear edge or at a rear wheel (48) of this vehicle side of the vehicle or of the vehicle/trailer combination and a third corner of the triangular cross section is arranged on a line that is perpendicular to the longitudinal centerline of the vehicle or of the vehicle/trailer combination and extends laterally outward from the first corner, and d2) a distance (dy_info) between the first corner and the third corner, as seen perpendicular to the longitudinal centerline of the vehicle or of the vehicle/trailer combination, is calculated based on:

the length (l_truck) of the vehicle or of the vehicle/trailer combination, and the position (dx) of the detected stationary object, as seen parallel to the longitudinal centerline of the vehicle or of the vehicle/trailer combination, and a fictitious radius (r) is calculated that the vehicle or the vehicle/trailer combination can still travel on at its speed (v_ego) prevailing during turning without a maximum permitted transverse acceleration (a_lat_max) being exceed in the process, and/or an actual radius (r) that the vehicle or the vehicle/trailer combination actually travels on when turning and that is determined based on the speed (v_ego) prevailing when the vehicle or the vehicle/trailer combination turns and the transverse acceleration (a_lat) of the vehicle or of the vehicle/trailer combination that prevails at that time.

2. The apparatus of claim 1, wherein the control device is configured to calculate the radius (r) according to the following calculation rule:

$$r = v\_ego^2/a\_lat\_max,$$

or in that it calculates the radius (r) according to the following calculation rule:

$$r = v\_ego^2/a\_lat$$

where:

v_ego is the speed of the vehicle or of the vehicle/trailer combination when turning, and a_lat_max is the maximum permitted transverse acceleration of the vehicle or of the vehicle/trailer combination when turning, a_lat is the actual transverse acceleration of the vehicle or of the vehicle/trailer combination when turning.

3. The apparatus of claim 2, wherein the control device is configured to calculate a maximum distance (dy_max) between the first corner and the third corner of the triangular cross section, which distance forms an upper limit for the distance (dy_info) between the first corner and the third corner of the triangular cross section, as seen perpendicular to the longitudinal centerline of the vehicle or of the vehicle/trailer combination, according to the following calculation rule:

$$dy\_max = \sqrt{r^2 + l_{truck}^2} - r$$

where l_truck is the length of the vehicle or of the vehicle/trailer combination, and r is the radius.

4. The apparatus of claim 3, wherein the control device is configured to calculate the distance (dy_info) between the first corner and the third corner of the triangular cross section, as seen perpendicular to the longitudinal centerline of the vehicle or of the vehicle/trailer combination, based on the detected position (dx) of the stationary object, as seen parallel to the longitudinal centerline of the vehicle or of the vehicle/trailer combination, according to the following calculation rule:

$$dy\_info = dy\_max * (l\_truck + dx)/l\_truck$$

where dy_max is the maximum distance between the first corner and the third corner of the triangular cross section, as seen perpendicular to the longitudinal centerline of the vehicle, and dx is the detected position of the stationary object parallel to the longitudinal centerline of the vehicle or of the vehicle/trailer combination, and l_truck is the length of the vehicle or of the vehicle/trailer combination.

5. The apparatus of claim 1, wherein the sensor device is arranged at the first corner.

6. The apparatus of claim 1, wherein the control device is configured so that it can to receive signals representing turning of the vehicle or of the vehicle/trailer combination.

7. The apparatus of claim 1, wherein the side detection area of the detection area is arranged laterally from the vehicle side that is the vehicle side facing away from a driver's seat of the vehicle.

8. The apparatus of claim 1, wherein the side detection area of the detection area is arranged laterally from the vehicle side that is the vehicle side facing the driver's seat of the vehicle.

9. The apparatus of claim 1, wherein the warning device is configured to generate a cascade of warning signals based on a hazard level of the by the by the turning of the vehicle or of the vehicle/trailer combination toward the detected stationary object.

10. The apparatus of claim 9, wherein the warning signals are visible signals with respective different colors and/or audible signals with respective different sounds and/or sound sequences.

11. A vehicle, comprising:

an apparatus for warning a vehicle driver of the vehicle or of a vehicle/trailer combination about a stationary object, including:

a) a sensor device having a detection area comprising a side detection area that is arranged laterally from a vehicle side and extends from a vehicle front to a vehicle rear, as seen in the direction of a longitudinal centerline of the vehicle or of the vehicle/trailer combination, wherein the sensor device is configured so that it can detect a stationary object within the detection area;

b) a control device, interacting with the sensor device, that is configured so that it evaluates the signals of the sensor device in respect of stationary objects detected within the detection area and defines a dynamically alterable warning area (A_info) that is smaller than the side detection area or no more than the same as it;

c) a warning device actuated by the control device such that it generates a warning signal to warn the vehicle driver only if the sensor device detects a stationary object in the dynamically alterable warning area (A_info);

wherein:

d) the control device is configured so that, on detection of a stationary object within the side detection area and on detection of the vehicle or the vehicle/trailer combination turning toward the vehicle side on which the side detection area is situated, it assigns a triangular cross section to the dynamically alterable warning area (A_info), wherein:

d1) a first corner of the triangular cross section is arranged at the front edge or at a front wheel of this vehicle side of the vehicle or of the vehicle/trailer combination, a second corner of the triangular cross section is arranged at the rear edge or at a rear wheel (48) of this vehicle side of the vehicle or of the vehicle/trailer combination and a third corner of the triangular cross section is arranged on a line that is perpendicular to the longitudinal centerline of the vehicle or of the vehicle/trailer combination and extends laterally outward from the first corner, and d2) a distance (dy_info) between the first corner and the third corner, as seen perpendicular to the longitudinal centerline of the vehicle or of the vehicle/trailer combination, is calculated based on:

the length (l_truck) of the vehicle or of the vehicle/trailer combination, and the position (dx) of the detected stationary object, as seen parallel to the longitudinal centerline of the vehicle or of the vehicle/trailer combination, and a fictitious radius (r) is calculated that the vehicle or the vehicle/trailer combination can still travel on at its speed (v_ego) prevailing during turning without a maximum permitted transverse acceleration (a_lat_max) being exceed in the process, and/or an actual radius (r) that the vehicle or the vehicle/trailer combination actually travels on when turning and that is determined based on the speed (v_ego) prevailing when the vehicle or the vehicle/trailer combination turns and the transverse acceleration (a_lat) of the vehicle or of the vehicle/trailer combination that prevails at that time.

* * * * *